(12) United States Patent
Hicks et al.

(10) Patent No.: US 10,954,152 B1
(45) Date of Patent: Mar. 23, 2021

(54) SUPERCRITICAL WATER OXIDATION FLAME-PILOTED VORTEX FLOW REACTOR

(71) Applicant: United States of America as represented by the Administrator of NASA, Washington, DC (US)

(72) Inventors: Michael C. Hicks, Cleveland, OH (US); Uday G. Hegde, Cleveland, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 16/808,897

(22) Filed: Mar. 4, 2020

Related U.S. Application Data

(60) Provisional application No. 62/815,433, filed on Mar. 8, 2019.

(51) Int. Cl.
| | | |
|---|---|---|
| *C02F 11/08* | (2006.01) | |
| *B01J 3/00* | (2006.01) | |
| *B01J 19/24* | (2006.01) | |
| *B01J 19/00* | (2006.01) | |
| *C02F 101/30* | (2006.01) | |

(52) U.S. Cl.
CPC .............. *C02F 11/086* (2013.01); *B01J 3/008* (2013.01); *B01J 19/006* (2013.01); *B01J 19/2415* (2013.01); *B01J 19/2465* (2013.01); *B01J 2219/00006* (2013.01); *B01J 2219/00031* (2013.01); *B01J 2219/00033* (2013.01); *B01J 2219/00157* (2013.01); *B01J 2219/00164* (2013.01); *B01J 2219/00772* (2013.01); *B01J 2219/185* (2013.01); *B01J 2219/1943* (2013.01); *C02F 2101/30* (2013.01);
(Continued)

(58) Field of Classification Search
CPC .... C02F 11/086; C02F 11/08; C02F 2101/30; C02F 2201/002; C02F 2301/026; C02F 2301/0066; B01J 3/008; B01J 19/006; B01J 19/2415; B01J 19/2405; B01J 19/2465; B01J 2219/00164; B01J 2219/00772; B01J 2219/185; B01J 2219/1943
See application file for complete search history.

(56) References Cited

U.S. PATENT DOCUMENTS 5,437,798 A * 8/1995 LaRoche ............... C02F 11/086
210/761

* cited by examiner

*Primary Examiner* — Lessanework Seifu
(74) *Attorney, Agent, or Firm* — Robert H. Earp, III; Mark Wolfgang; Helen M. Galus

(57) ABSTRACT

A supercritical water oxidation-flame piloted vortex reactor has a hydrothermal flame produced within the interior of the reactor fed by a fuel including a waste water stream, and has a subcritical wash stream, including water below its critical point, that creates an upward helical flow in the material within the reactor. The hydrothermal flame and upward helical flow produce within the reactor a supercritical core region, a subcritical outer region around the core region, and a transcritical intermediate region between them. The upward helical flow serves to transfer precipitated ionic compounds out of the supercritical core region, through the transcritical intermediate region, and into the subcritical outer region where they re-dissolve. A processed flow, including purified water, is removed from an upper portion of the supercritical core region by an aspirator.

20 Claims, 1 Drawing Sheet

(52) U.S. Cl.
CPC .. *C02F 2201/002* (2013.01); *C02F 2301/026* (2013.01); *C02F 2301/066* (2013.01)

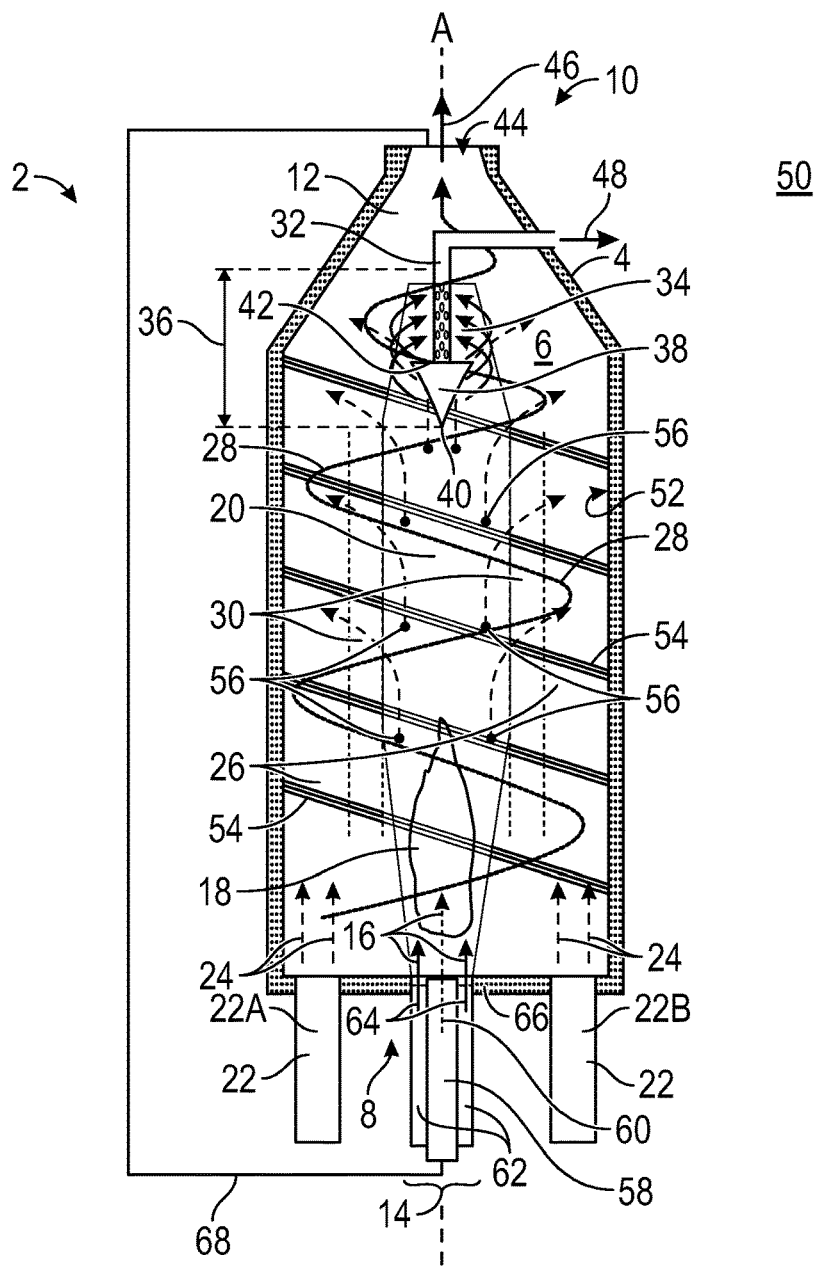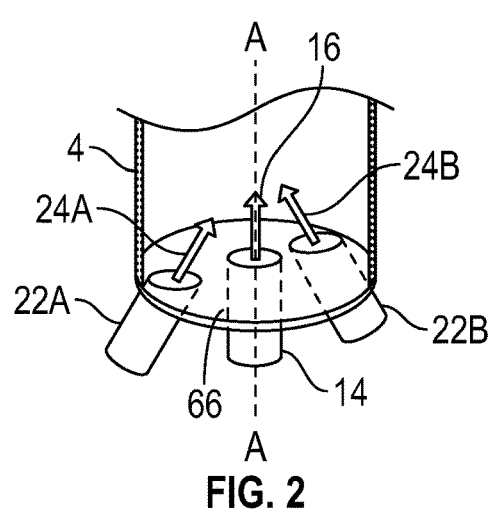
FIG. 1
FIG. 2

SUPERCRITICAL WATER OXIDATION FLAME-PILOTED VORTEX FLOW REACTOR

CROSS REFERENCE TO RELATED APPLICATION

This application claims priority to U.S. Provisional Patent Application Ser. No. 62/815,433 filed Mar. 8, 2019, which is expressly incorporated herein by reference.

ORIGIN OF THE INVENTION

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND

Supercritical water (SCW) refers to water whose temperature and pressure are above its critical point (where Tc=374° C. and Pc=22.1 MPa). Supercritical water oxidation (SCWO) based reactors have been used for purposes of waste destruction and/or water reclamation in wet waste streams. However, successful application of these conventional SCWO based reactors for waste destruction and/or water reclamation in wet waste streams has been elusive.

Much of the impediment preventing widespread utilization of this technology stems primarily from two key factors. The first factor is that in order to sustain reaction temperatures in the reactor's bulk fluid, conventional SCWO reactors have traditionally relied on an external heating process that applies heat through the walls of the reactor vessel to heat the material inside the reactor. This external heating process requires the walls of the reactor vessel to be excessively thick in order to compensate for the direct application of heat thereto, and the associated temperature deration of the maximum yield stresses of the reactor material.

The second factor impeding the successful use of conventional SCWO reactors is associated with the unique change in the thermophysical properties of water that occur when this fluid is taken past its critical point. That is, water undergoes a dramatic transition at near-critical conditions where it no longer behaves as a polar molecule and as a result, all ionic substances (e.g., salts) become non-soluble in water and begin to precipitate from the solution. The precipitates agglomerate and will eventually leave a thick deposited buildup on the surfaces of the reactor walls and inside critical flow passages, and contaminate other critical heat transfer surfaces. This buildup of precipitates impedes the efficiency and successful operation of the reactor.

SUMMARY

In one aspect, a supercritical water oxidation flame-piloted vortex reactor includes a reactor shell, a burner assembly, an injector assembly, and an aspirator. The reactor shell defines an enclosed volume, has a longitudinal axis extending between a bottom of the reactor shell and a top of the reactor shell, and is configured to contain a pressurized and heated material including water. The burner assembly comprises a co-flow injector that is arranged at the bottom of the reactor shell and is configured to deliver two separate steams, including a "fuel" stream (i.e. any waste entrained and/or in solution that can be oxidized to release energy) and an oxidizer stream, into the enclosed volume to thereby create in the enclosed volume a hydrothermal flame and, as a result of the hydrothermal flame, a supercritical core region comprising water above its critical point and any wastes that will be oxidized The injector assembly is arranged at the bottom of the reactor shell and is configured to inject into the enclosed volume a subcritical "wash stream" that will comprise subcritical water, to create in the enclosed volume a subcritical outer region arranged radially around the supercritical core region. This wash stream will have an upward helical flow pattern designed to generate and stabilize, a transcritical "transition annulus" arranged radially between the supercritical core region and the subcritical outer region, referred to as the "subcritical wall annulus". The subcritical wall annulus will maintain wall temperatures below Tc and will redissolve any ionic salts that may have precipitated in the supercritical core. The transcritical transition annulus will comprise water that is actively transitioning through its critical point and will consist of water having radial and axial temperature gradients ranging from temperatures above Tc at the interface of the supercritical core and the transcritical transition annulus to below Tc at the interface of the transcritical transition annulus and the subcritical wall annulus. The location of the fluid interface between the supercritical core and the transcritical transition annulus is defined by the locus of radial temperatures $Ti_1=f_1(r, z)$ where $Ti_1=430°$ C. The location of the fluid interface between the transcritical transition annulus and the subcritical wall annulus is defined by the locus of temperatures, $Ti_2=f_2(r, z)$ where $Ti_2=374°$ C. As such, the transcritical transition annulus will comprise water at various stages of transition between its subcritical and supercritical phases and will consequently be a highly dynamic region characterized by high gradients in the fluid's thermophysical properties. The aspirator is arranged in the enclosed volume, and is configured to remove a processed flow consisting predominantly of purified water from an upper portion of the supercritical core region.

In another aspect, a method of purifying a waste water stream using a supercritical water oxidation flame piloted vortex reactor is provided. The reactor includes a reactor shell defining an enclosed volume, having a longitudinal axis extending between a bottom of the reactor shell and a top of the reactor shell; a burner assembly arranged at the bottom of the reactor shell; an injector assembly arranged at the bottom of the reactor shell; helical vanes arranged on an interior surface of the reactor shell, extending upward on the interior surface between the bottom of the reactor shell and the top of the reactor shell, and being raised from the interior surface; an aspirator arranged in the enclosed volume; a tapered diverter arranged in the enclosed volume at a bottom of the aspirator, and including a small end facing toward the bottom of the reactor shell and a large end facing toward a top of the reactor shell; and a vent arranged at the top of the reactor shell. The method includes delivering fuel, including the waste water stream, via the burner assembly into the enclosed volume at a bottom of the reactor shell; raising a temperature and a pressure in the enclosed volume; igniting the fuel to generate in the enclosed volume a hydrothermal flame and a supercritical core region including water above its critical point, such that organic waste material in the waste water stream is converted into $CO_2$ and additional $H_2O$; injecting a subcritical wash stream via the injector assembly into the enclosed volume at the bottom of the reactor shell to create in the enclosed volume a subcritical outer region arranged radially around the supercritical core region, including water below its critical point, and having an upward helical flow, and a transcritical transition annulus region arranged radially between the supercritical core region and the subcritical outer region and including water transitioning through its critical point; and removing via the aspirator a processed flow including purified water from an upper portion of the supercritical core region.

BRIEF DESCRIPTION OF THE DRAWINGS

FIG. 1 is a schematic cross-sectional view of a super critical water oxidation flame-piloted vortex reactor according to the present subject matter.

FIG. 2 is a partial perspective view of a bottom of the reactor of FIG. 1 and flow directions of material into the reactor.

DETAILED DESCRIPTION

Closed loop systems for water processing and reclamation remain a limiting factor for extended duration missions currently contemplated under NASA's exploration initiative. Current systems typically find limitations in recovery efficiencies, system mass, operational costs, maintenance costs, waste stream preconditions, residual microbial contamination, and/or the overall capability of meeting potable water standards. The present invention employs Supercritical Water Oxidation (SCWO) with a hydrothermal flame to initiate and control the means for reactor heating.

Super Critical Water Oxidation (SCWO) is a technology in which waste water and/or a slurry processed solid waste stream is introduced into a reaction vessel at temperatures and pressures above the critical point of water (i.e., 374° C. and 22.1 MPa). At levels above the critical point, distinctions between liquid and solid phases no longer exist, and gases (e.g., $O_2$, $N_2$, and $CO_2$) and most organic material become highly soluble in water.

In typical SCWO operating conditions (e.g., 450° C.–550° C. and 25 MPa) oxidation of carbonaceous waste consistently exceeds 99.99% with reactor residence times often well under 1 minute. High reaction efficiencies are largely due to the changes in the diffusive time scales governing thermal, mass and momentum transport within the reactor, as well as the elevated temperature and pressure hydrolysis that occurs, which serves to condition the organic wastes for efficient oxidation by breaking down large organic molecules into smaller constituent molecules. At supercritical conditions, the associated diffusive time scales are similar to that of gases. Consequently, when operated in the appropriate regime, this technology has the potential to separate inorganic material, oxidize essentially all organics, and eliminate microbial contamination. The product stream, depending on the constituents of the feed stream and the operating regime, will typically consist of $CO_2$, $N_2$, water, inorganic precipitate, and potentially mineral acids (from organic sulfur, phosphorous, halogens) and small amounts of nitrous oxides (from organic $N_2$).

However, because of the depolarization of the water molecule at supercritical conditions, ionic substances, (e.g. inorganic salts such as NaCl, $MgCl_2$, $CaCl_2$)) become insoluble and being to precipitate out as solids. For example, NaCl has a solubility at ambient conditions (i.e., 25° C. and 0.101 MPa) of approximately 30% by weight in water, whereas at supercritical conditions (i.e., above 374° C. and 22.1 MPa) the solubility reduces to less than 0.003% by weight in supercritical water. These precipitated ionic substances may form deposits on interior surfaces of conventional SCWO reactors. Moreover, these conventional SCWO reactors are heated from the outside of the reactor in order to bring the contents of the reactor up to supercritical conditions. This external heating subjects the reactor to high thermal stresses, and thus requires relatively thick, expensive, exotic metals to account for these thermal stresses.

The present invention addresses the issues associated with exposure of the reactor walls to corrosive supercritical products and excessive temperatures, by inhibiting the internal surfaces of the reactor from being exposed to supercritical water conditions. This is accomplished by maintaining an axisymmetric core region within the reactor. The supercritical core region is the only region within the reactor that is maintained at supercritical conditions, and is where the bulk of the oxidation reactions will occur. Supercritical conditions are established by the initiation, stabilization, and control of a hydrothermal flame in the core region as a heat source to produce supercritical conditions within the reactor. Further, the present invention also provides a subcritical outer region around the core region that is below the critical point of water. The subcritical outer region is provided by use of a subcritical wash stream injected in an upward helical flow around the hydrothermal flame.

The subcritical outer region inhibits interior reactor surfaces from being exposed to the highly corrosive supercritical water and the scaling potential associated with inorganic chemicals (e.g., salts) that will precipitate from solution at supercritical conditions (i.e., T>374° C. and P>22.1 MPa). By use of the controlled axisymmetric hydrothermal flame and the subcritical wash stream, the supercritical conditions are maintained exclusively in the reactor's core region and away from interior surfaces of the reactor, thereby inhibiting scaling or deposition of the precipitate on the interior surfaces of the reactor.

With reference to the figures, a supercritical water oxidation-flame piloted vortex reactor ("SCWO-FPV reactor") 2 includes a reactor shell 4 defining an enclosed volume 6, having a longitudinal axis (A) extending between a bottom 8 of the reactor shell 4 and a top 10 of the reactor shell 4, and configured to contain a pressurized and heated material 12 including water. The reactor 2 includes a burner assembly 14 arranged at the bottom 8 of the reactor shell 4 and configured to deliver a fuel 16 into the enclosed volume 6. The fuel 16 is ignited (either spontaneously and/or through an ignition system, not shown) and feeds a hydrothermal flame 18, thereby heating the material 12 and creating a supercritical core region 20 (also referred to as "supercritical core") in the enclosed volume 6. The supercritical core region 20 includes water above its critical point.

The reactor 2 includes an injector assembly 22 arranged at the bottom 8 of the reactor shell 4 and configured to inject into the enclosed volume 6 a subcritical wash stream 24 including water below its critical point, to thereby create in the enclosed volume 6 a subcritical outer region 26 (also referred to as "subcritical wall annulus") arranged radially around the supercritical core region 20, and including water below its critical point, and a transcritical intermediate region 30 (also referred to as "transcritical transition annulus") arranged radially between the supercritical core region 20 and the subcritical outer region 26 and including water transitioning through its critical point.

The reactor 2 includes an aspirator 32 arranged in the enclosed volume 6, and configured to remove a processed flow 34 of material, consisting largely of purified water, from an upper portion 36 of the supercritical core region 20 and deliver it as a product stream 48 to an exterior 50 of the reactor shell 4.

The reactor 2 includes a tapered diverter 38 arranged in the enclosed volume 6 at a bottom of the aspirator 32, and including a small end 40 facing toward the bottom 8 of the reactor shell 4 and a large end 42 facing toward the top 10 of the reactor shell 4. The diverter 38 may be cone-shaped, having an apex facing the bottom 8 of the reactor shell 4. The aspirator 32 and the diverter 38 are coaxial with the longitudinal axis (A) of the reactor shell 4.

The reactor 2 includes a vent 44 arranged at the top 10 of the reactor shell 4 and configured to remove a waste stream 46 including unpurified water from the enclosed volume 6.

Interior surfaces 52 of the reactor shell 4 may include helical vanes 54 configured to assist in the upward helical flow 28 of material 12, especially in the subcritical outer region 26. The helical vanes 54 twist helically upward between the bottom 8 of the reactor shell 4 and the top 10 of the reactor shell 4. The vanes 54 are raised from the interior surface 52 and project into the enclosed volume 6. Alternatively, the vanes 54 could be included as a separate insert, which could be arranged inside the reactor 2.

In operation, a flame-piloted vortex (i.e. flame-piloted upward helical flow 28 of material 12) is created within the enclosed volume 4 of the reactor shell 6 for purposes of waste destruction and/or water reclamation in wet waste streams. The upward helical flow 28 (i.e. vortical flow) is a product of the injector assembly 22 injecting the subcritical wash stream 24 from the bottom 8 of the reactor shell 4 in a direction skew with respect to the longitudinal axis (A) of the reactor shell 4. Two lines are skew lines if they do not lie in the same plane and do not intersect. In other words, the first portion 24A and the second portion 24B of the subcritical wash stream 24 are each injected in a direction skew with respect to the longitudinal axis (A) of the reactor shell 4, and the first portion 24A and the second portion 24B of the subcritical wash stream 24 are injected in a direction skew with respect to each other.

The upward helical flow 28 is a product of injecting the subcritical wash stream 24, and is present in all three regions 20, 26, 30 of the reactor 2, where all three regions 20, 26, 30 assume the upward helical flow 28 through fluid dynamics within the enclosed volume 6. The three regions 20, 26, 30 assume the upward helical flow 28 of the material 12 by the combined effects of the skew injection angle of the subcritical wash stream 24, the hydrothermal flame 18, the discharging of the waste stream 46 through the vent 44, and the extraction of the processed flow 34 through the aspirator 32.

The upward helical flow 28 acts as a stabilizer for the supercritical core region 20. Ionic substances that precipitate and agglomerate in the supercritical core region 20 will, by virtue of their increased mass due to progressive agglomeration as they are transported vertically upward in the reactor, will tend to be transported radially outward. This radially outward migration of precipitate is induced by the "apparent centrifugal" force created by the vortical flow. This precipitate will redissolve in the subcritical wash stream that isolates and protects the interior surfaces 52 of the reactor shell 4 from a potential buildup of the precipitate formed in the supercritical core region 20.

This injection angle for the subcritical wash stream 24 is depicted for example in FIG. 2, where the injector assembly 22 includes a first injector 22A and a second injector 22B. The first injector 22A is configured to inject a first portion 24A of the subcritical wash stream 24 into the enclosed volume 6, and the second injector 22B is configured to inject a second portion 24B of the subcritical wash stream 24 into the enclosed volume 6. The first injector 22A and the second injector 22B are arranged on opposite lateral sides of the burner assembly 14 from each other, as shown in the figures. The first injector 22A is configured to inject the first portion 24A of the subcritical wash stream 24 in a first injection direction (indicated by arrow) that is skew with respect to the longitudinal axis (A) of the reactor shell 4 and is skew with respect to a second injection direction (indicated by arrow) for the second portion 24B of the subcritical wash stream 24, while the second injector 22B is configured to inject the second portion 24B of the subcritical wash stream 24 in the second injection direction that is skew with respect to the longitudinal axis (A) of the reactor shell 4 and is skew with respect to the first injection direction.

These injection angles for the first and second portions 24A, 24B of the subcritical wash stream 24 create upward helical flow 28 of the material 12 within the enclosed volume 6 that is coaxial with the longitudinal axis (A) and directed from the bottom 8 to the top 10 of the reactor shell 4, and which may be further assisted by the helical vanes 54.

The SCWO-FPV reactor 2 addresses problems associated with external heating of conventional SCWO reactors, by heating the material 12 (including water) inside the reactor shell 6 using a hydrothermal flame 18, which is produced by combustion of the fuel 16. The hydrothermal flame 18, fed by the fuel 16, helps create in the enclosed volume 4 the supercritical core region 20 including supercritical water, i.e. water above its critical point. For increasing pressure within the enclosed volume 4, the reactor 2 may include a pump or other device (not shown), or may be connected to such device.

The hydrothermal flame 18 provides an internal heating process for heating the material 12 within the enclosed volume 6. The hydrothermal flame 18 is fed by the fuel 16, which includes the waste water stream 60. The waste water steam 20 includes water and organic waste material. The organic waste material in the waste water stream 20 is oxidized in the supercritical core region 20 and thus converted into carbonaceous material, this being primarily $CO_2$.

This internal heating process of the reactor 2, along with the injection of the subcritical wash stream 24, produces three controlled regions in the material 12 of the reactor 2; these being (i) the supercritical core region 20 where water is above its critical point, (ii) the transcritical intermediate region 30 where water is at or transitioning through its critical point, and (iii) the sub-critical outer region 26 where water is below its critical point. The three regions 20, 26, 20 within the reactor 2 are indicated in FIG. 1 by the four vertical dashed lines. It will be appreciated that the indicated demarcation between the three regions 20, 26, 30 is included for convenience and understanding, and that these three regions 20, 26, 30 may not have such well-defined borders between them, but nevertheless exist during operation of the reactor 2 and are distinct from one another. In general, the three regions 20, 26, 30 can be understood as being concentric cylinders extending along, and being coaxial with, the longitudinal axis (A) of the reactor shell 4.

The radial thickness of each of these three regions 20, 26, 30 may be controlled in part by controlling the subcritical wash stream 24, which is a vortical injection stream of subcritical water. During operation of the reactor 2, precipitated ionic substances 56 that precipitate out of supercritical water in the supercritical core region 20 move radially/laterally outward due to the upward helical flow 28 of material 12 created by the subcritical wash stream 24. The precipitated ionic substances 56 move as indicated by the arrows, from the supercritical core region 20, through the transcritical intermediate region 30, and into subcritical outer region 26 where they dissolve. This radial outward movement of the precipitated ionic substances 56 is a result of the upward helical flow 28 acting on the solid, and thus denser, precipitated ionic substances 56 to urge them in this direction away from the supercritical core region 20.

The establishment and control of the subcritical outer region 26 may thus address the problems associated with deposit buildup on reactor surfaces associated with conventional reactors, because in the subcritical outer region 26, water is below its critical point, and thus re-dissolves the precipitated ionic substances 56 as they enter and remain in the subcritical outer region 26. Since these ionic substances are re-dissolved, their buildup on the reactor surfaces is inhibited, and instead these re-dissolved ion substances can be flushed from the reactor 2 in the waste stream 46 during operation of the reactor 2.

The tapered diverter 38 will further assist in moving any more-dense precipitated ionic substances 56 radially outward from the supercritical core region 20 toward the subcritical outer region 26, while the less-dense processed flow 34, including supercritical water and oxidized carbonaceous material, this being primarily $CO_2$, will be drawn out of the supercritical core region 20 by means of the aspirator 32, which is strategically positioned after (in the flow direction from) the diverter 38.

In particular, the diverter 38 serves to redirect precipitated ionic substances 56 away from the inlet holes of the aspirator 32. The precipitated ionic substances 56 will generally comprise salts that readily precipitate from supercritical water, along with any oxides that may have formed from the SCWO conversion process in the supercritical core region 20. The functioning of the upward helical flow 28 on these solid substances is similar to a cyclone separator, where a vortical flow field is used to separate dust from gas streams. In the invention, the precipitated ionic substances 56 will begin to agglomerate and form large particles in the supercritical core region 20, and these will have sufficient mass and surface area that will prevent the precipitated ionic substances 56 from navigating the sharp flow transition around the diverter 38, which sharp flow is created by the geometry of the diverter 38 and which flow will be required for intake into the aspirator 38. This sharp flow transition, along with the apparent centrifugal force created by the vortical flow field (i.e. upward helical flow 28) throughout the reactor, combine to effectively separate any particulates above a certain size and mass threshold from the processed flow 34 before it is eventually ingested by the aspirator 34. The processed flow 34 moves around the diverter 38 and into inlet holes in the aspirator 32 due to the interior of the aspirator 32 being at a lower pressure than the enclosed volume 6. The lower pressure in the interior of the aspirator 32 urges the processed flow 34 into the interior of the aspirator 32. The aspirator 34 is designed to withdraw the processed flow 34, at the point where it comprises predominantly pure water, dissolved gases (primarily $CO_2$), and potentially trace amounts of solids that may have managed to navigate the tortuous path to the aspirator. The processed flow 34 is then delivered by the aspirator 32 to the exterior 50 of the reactor shell 4 as the product stream 48, where the $CO_2$ can be removed from the water by filtering or flashing. The reactor 2 and associate methods may include a post extraction component/stage, where a staged distillation process, created by virtue of a strategic pressure relief protocol, will vent off any dissolved gases from the product stream 48. This will allow for convenient separation and capture of the $CO_2$ created by the oxidation process for potential sequestration. Once pressure of the processed flow 34/product stream 48 drops below the critical pressure (ca 210 atm), the supercritical water will become sub-critical and begin to condense as pure water at which point it can be captured and further separated from any trace contaminants that may have persisted in the product stream 48, by use of conventional condensation recovery systems.

The rector 2 utilizes internal heating from the hydrothermal flame 18 to sustain the supercritical environment for supercritical water oxidation, rather than conventional external heating. Because of this, the supercritical core region 20 may experience temperatures in excess of the critical point of water (i.e., 374° C.), while the reactor shell 4 may not experience temperatures at or in excess of the critical point of water. Because of these lower reactor shell 4 temperatures as compared to convention external heating reactors, the reactor shell 4 may be constructed from less exotic, less expensive, and less thick steel alloys because they are not subject to the high thermal stresses of convention external heating reactors. Further, because the subcritical outer region 26 is below the critical point of water, the interior surfaces 52 of the reactor shell 4 may not have to be protected from the highly corrosive nature of supercritical water.

Further, the subcritical outer region 26 being below the critical point of water, allows for the re-dissolution of the precipitated ionic substances 56 that may have precipitated from solution in the supercritical core region 20 and have moved to the subcritical outer region 26.

Concerns associated with corrosion/fouling of heat transfer surfaces are largely eliminated in the present invention, since the primary heat source, the hydrothermal flame 18, is internal to the reactor 2. As a result, the reactor shell 4 is not exposed to supercritical conditions when appropriate flow conditions of the material 12 are maintained in the enclosed volume 6.

Appropriate flow conditions of the reactor material 12 and appropriate thermal conditions may be maintained by the use of the burner assembly 14, which is a co-flow injector including a core feed 58, configured to deliver an aqueous waste water stream 60 into the enclosed volume 6, and a coaxial oxidizer feed 62 arranged annularly around the core feed 58 and configured to deliver an oxidizer 64 into the enclosed volume 6.

The waste water stream 60 includes a waste stream of organic material, and possibly an augmenting fuel (e.g., ethanol, methanol or other energetics and water soluble hydrocarbon) optionally included to augment, if necessary, the energetic content of the waste water stream 60. The fuel augmentation may be operationally controlled in order to maintain a certain level of energetic content in the waste water stream 60, should the energetic material in the waste stream 60 not be sufficient to ignite and/or sustain a hydrothermal flame 18.

In this flow configuration, defined here as the "conventional flow configuration," the waste water stream 60 is injected by the core feed 58, and the oxidizer 64 flows through the oxidizer feed 62. The oxidizer 64 will comprise a fluid (e.g., Air, $H_2O_2$, or various blends of $O_2$ with diluents, or pure $O_2$) consisting of sufficient concentration of $O_2$ to meet the oxidation demands of the organic and inorganic materials in the waste stream 60.

In another aspect of operation, defined here as the "inverse flow configuration," the appropriate flow conditions will be maintained within the reactor 2 by injecting the waste stream 60 (and augmenting fuel if it necessary to augment the energy content of the waste stream 60) through the oxidizer feed 62 arranged annularly surrounding the core feed 58, while the oxidizer 64 is injected through the core feed 58. In this inverse flow configuration, the injection sites for the oxidizer and waste water 60 are inverted from the conventional flow configuration.

In each of the two alternate flow configurations, an aqueous waste water stream 60 will be mixed with augmenting fuel, should it be necessary to inject augmenting fuel, prior to entering the reactor 2. The mixing of the waste water stream 60 and augmenting fuel may be accomplished in a mixing chamber (not shown), which may be an upstream section of the burner assembly 14 in FIG. 1. An "energetic waste stream" comprises only the initial waste water stream 60, or comprises the initial waste water stream 60 augmented with the augmenting fuel (e.g. a hydrocarbon). This energetic waste stream may then be mixed with the oxidizer 64 immediately after leaving the mixing chamber and being injected into the enclosed volume 6.

The energetic waste stream will then come into contact with the oxidizer 64, forming a combined reactor stream (i.e. fuel 16). Depending on the velocity and temperatures of the fuel 16 injected at this location at the bottom of the reactor 2, a reactant mixing chamber (not shown) may be necessary in order to spontaneously ignite and sustain the hydrothermal flame 18.

Ignition of the hydrothermal flame 18 may also be initiated by an ignition system such as a spark from an igniter in the enclosed volume 6, or by raising the temperature and pressure in the enclosed volume 6, or by other measures.

The core feed 58 and the oxidizer feed 62 are configured to not premix the waste water stream 60 and the oxidizer 64 before the waste water stream 60 and the oxidizer 64 are introduced into the enclosed volume 6 and thus inhibit premature ignition of the fuel 16. In this regard, the core feed 58 and the oxidizer feed 62 may be separate feed paths. In this sense, the fuel 16 is an aqueous waste water stream 60 including 10-40% of a carbonaceous organic content, derived from organic waste material in the waste water stream and from any augmenting fuel mixed with the waste water stream 60 to elevate the energetics of the waste water stream 60. The amount of oxidizer 62 may be adjusted to control the extent of the reaction of the hydrothermal flame 18, and will be modulated to conform to the amount of carbonaceous organic content that is in the fuel 16.

The energetic waste stream (i.e. consisting of only the initial waste water stream 60, or consisting of the initial waste water stream 60 augmented with the augmenting fuel) will be injected into the enclosed volume 6 in a direction coaxial with the longitudinal axis (A) of the reactor shell 4 as indicated by the arrow in FIG. 2. This energetic waste stream will then be mixed with the oxidizer 64 forming the fuel 16 stream just downstream of exit planes of the core feed 58 and the oxidizer feed 62, in order to establish and sustain the hydrothermal flame 18 at the bottom 8 of the reactor shell 4. The energetic waste stream will then be mixed with the oxidizer 64 may be injected through a bottom wall 66 at the base of the reactor shell 4, for maintaining the hydrothermal flame 18.

Once the hydrothermal flame 18 is initiated and stabilized, the subcritical wash stream 24, is established. The subcritical wash stream 24 (also referred to as "wash stream") may be predominantly water with an organic content less than 5%, and may be injected near the bottom 8 of the reactor shell 4, e.g. through the bottom wall 66 at the base of the reactor shell 4, for the purpose of maintaining the subcritical conditions at the interior surfaces 52 of the reactor shell 4 and in the subcritical outer region 26. The subcritical wash stream 24 also serves to re-dissolve and/or flush from the reactor any precipitated ionic substances 56 and/or any non-soluble inorganic materials generated from the supercritical core region 20 of the reactor 2.

Once a flow in the supercritical core region 20 and the subcritical outer region 26 are established, mixing between the supercritical core region 20 and the subcritical outer region 26 is largely eliminated due to their large differences in density and viscosity. Depending on the hydrocarbon content of the fuel 16, the hydrothermal flame 18 may be used to sustain supercritical temperatures in the supercritical core region 20, or may be used as a pilot to initiate supercritical temperatures and subsequently turned off once energy release from fuel 16 is sufficient to sustain supercritical temperatures.

The upward helical flow 28 is further stabilized by generating a vortex using the helical vanes 54 placed on the interior surfaces 52 of the reactor shell 4. The vanes 54 will serve a dual role as a flow stabilizer to prevent bulk mixing between the much denser subcritical outer region 26 and the supercritical core region 20, and as a mechanism for phase separation of the precipitated ionic substances 56, where precipitated ionic substances 56 and other inorganic particles will be transported through the action of centripetal forces generated by the upward helical flow 28, through the transcritical intermediate region 30, and migrate to the subcritical outer region 26.

The aspirator 32 and tapered diverter 38 are arranged in the enclosed volume 6, and remove the processed flow 34 of material, including purified water, from the upper portion 36 of the supercritical core region 20, which is deliver through the interior of the aspirator 32 as a product stream 48 to an exterior 50 of the reactor shell 4. Material 12 that is not extracted through the aspirator 32 will be extracted from the enclosed volume 6 though the vent 44 as the waste stream 46. The vent 44 may be in fluid communication with the burner assembly 14 via a line 68 that is external to the reactor shell 4 so as to recycle the waste stream 46 back into the enclosed volume 6 as part of the fuel 16. The line 68 extends between the vent 44 and the core feed 58 of the burner assembly 14. The rate and amount of aspiration of the processed flow 34 through the aspirator 32 will be determined by monitoring of the product stream 48, and may depend on content of the waste water stream 60 and overall operating conditions.

The present SCWO-FPV reactor 2 treats waste water so that organics are completely converted, heavy metals are oxidized to their highest oxidation states, and allows for metal oxides to be safely removed from a product stream. As such, the reactor 2 can be used in various industrial applications such as general waste management, such as the processing of wet waste streams (e.g., sludge from commercial farms other agri-business waste streams); hazardous waste management systems to destroy hazardous wastes (i.e., DOD weapons demilitarization programs, pre-discharge treatment of navy/commercial ship wastes to conform to international treaties EPA); in the pharmaceutical industry (e.g., treating pharmaceutical waste streams contaminated with harmful active materials); for synthesis of bio-fuels using SCW (i.e., processing of waste streams without oxidizing); in the nuclear power industry (e.g., by treating radiation contaminated organic waste streams); or in a water reclamation application (e.g., desalination of unusable aquifers due to high salinity resulting from unsustainable extraction rates, treatment of algae blooms occurring in freshwater lakes due to untreated run-off from agricultural lands, water treatment for waste streams generated from food processing business, waste streams from paper mills, etc.).

A method of removing contaminants from water using the supercritical water oxidation flame piloted vortex reactor 2 is provided. The method includes introducing a material 12 including water into the enclosed volume 6. The material 12 may be introduced via the burner assembly 14, the injector assembly 22, or otherwise. The method includes delivering fuel 16 via the burner assembly 14 into the enclosed volume 6 at a bottom 8 of the reactor shell 4, and raising the temperature and pressure in the enclosed volume 6. The fuel 16 is ignited to generate in the enclosed volume 6 a hydrothermal flame 18 and a supercritical core region 20 including water above its critical point. The method includes injecting a subcritical wash stream 24 via the injector assembly 22 into the enclosed volume 6 at the bottom 8 of the reactor shell 4 to create in the enclosed volume a subcritical outer region 26 arranged radially around the supercritical core region 20, including water below its critical point, and having an upward helical flow 28, and a transcritical intermediate region 30 arranged radially between the supercritical core region 20 and the subcritical outer region 26 and including water transitioning through its critical point. The method includes removing via the aspirator 32 a processed flow 34 including purified water from an upper portion 36 of the supercritical core region 20. The method may be a continuous or a semi-continuous process of purifying water.

The method may also include discharging via the vent 44 a waste stream 46 including unpurified water from the enclosed volume 6, which may be recycled back into the enclosed volume 6 via the burner assembly 14.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A supercritical water oxidation flame-piloted vortex reactor comprising:
a reactor shell defining an enclosed volume, having a longitudinal axis extending between a bottom of the reactor shell and a top of the reactor shell, and configured to contain a pressurized and heated material including water;
a burner assembly arranged at the bottom of the reactor shell and configured to deliver a fuel into the enclosed volume to thereby create in the enclosed volume a hydrothermal flame and a supercritical core region in the material, the supercritical core region including water above its critical point;
an injector assembly arranged at the bottom of the reactor shell and configured to inject into the enclosed volume a subcritical wash stream including water below its critical point, to thereby create in the enclosed volume a subcritical outer region arranged radially around the supercritical core region, having an upward helical flow, and including water below its critical point, and a transcritical intermediate region arranged radially between the supercritical core region and the subcritical outer region and including water transitioning through its critical point; and
an aspirator arranged in the enclosed volume, and configured to remove a processed flow including purified water from an upper portion of the supercritical core region.

2. The reactor according to claim 1, wherein:
the injector assembly includes a first injector and a second injector;
the first injector is configured to inject a first portion of the subcritical wash stream into the enclosed volume;
the second injector is configured to inject a second portion of the subcritical wash stream into the enclosed volume; and
the first injector and the second injector are arranged on opposite lateral sides of the burner assembly from each other.

3. The reactor according to claim 2, wherein:
the first injector is configured to inject the first portion of the subcritical wash stream in a first injection direction that is skew with respect to the longitudinal axis of the reactor shell and is skew with respect to a second injection direction for the second portion of the subcritical wash stream;
the second injector is configured to inject the second portion of the subcritical wash stream in the second injection direction that is skew with respect to the longitudinal axis of the reactor shell and is skew with respect to the first injection direction.

4. The reactor according to claim 1, further including:
a tapered diverter arranged in the enclosed volume at a bottom of the aspirator, and including a small end facing toward the bottom of the reactor shell and a large end facing toward the top of the reactor shell; and
a vent arranged at the top of the reactor shell and configured to remove a waste stream including unpurified water from the enclosed volume.

5. The reactor according to claim 4, wherein:
the diverter is cone-shaped and has an apex facing the bottom of the reactor shell; and
the aspirator and the diverter are coaxial with the longitudinal axis of the reactor shell.

6. The reactor according to claim 4, wherein the vent is in fluid communication with the burner assembly via a path that is external to the reactor shell so as to recycle the waste stream back into the enclosed volume as part of the fuel.

7. The reactor according to claim 1, wherein:
the burner assembly is configured to deliver a two-part fuel including a waste water stream and an oxidizer;
the burner assembly includes a core feed configured to deliver the waste water stream into the enclosed volume, and an oxidizer feed arranged annularly around the core feed and configured to deliver the oxidizer into the enclosed volume; and
the core feed and the oxidizer feed are configured to not premix the waste water stream and the oxidizer before the waste water stream and the oxidizer are introduced into the enclosed volume.

8. The reactor according to claim 1, wherein:
the burner assembly is configured to deliver the fuel through a bottom wall of the reactor shell; and
the injector assembly is configured to inject the subcritical wash stream through the bottom wall of the reactor shell.

9. The reactor according to claim 1, wherein:
interior surfaces of the reactor shell include helical vanes configured to assist in the helical flow of the subcritical outer region;

the helical vanes extend upward between the bottom of the reactor shell and the top of the reactor shell; and the vanes are raised from the interior surface and project into the enclosed volume.

10. A method of purifying a waste water stream using a supercritical water oxidation flame piloted vortex reactor comprising:

a reactor shell defining an enclosed volume, having a longitudinal axis extending between a bottom of the reactor shell and a top of the reactor shell;

a burner assembly arranged at the bottom of the reactor shell;

an injector assembly arranged at the bottom of the reactor shell;

helical vanes arranged on an interior surface of the reactor shell, extending upward on the interior surface between the bottom of the reactor shell and the top of the reactor shell, and being raised from the interior surface;

an aspirator arranged in the enclosed volume;

a tapered diverter arranged in the enclosed volume at a bottom of the aspirator, and including a small end facing toward the bottom of the reactor shell and a large end facing toward a top of the reactor shell; and a vent arranged at the top of the reactor shell, the method comprising:

delivering a fuel, including the waste water stream, via the burner assembly into the enclosed volume at a bottom of the reactor shell;

raising a temperature and a pressure in the enclosed volume;

igniting the fuel to generate in the enclosed volume a hydrothermal flame and a supercritical core region including water above its critical point, such that organic waste material in the waste water stream is converted into $CO_2$;

injecting a subcritical wash stream via the injector assembly into the enclosed volume at the bottom of the reactor shell to create in the enclosed volume a subcritical outer region arranged radially around the supercritical core region, including water below its critical point, and having an upward helical flow, and a transcritical intermediate region arranged radially between the supercritical core region and the subcritical outer region and including water transitioning through its critical point; and removing via the aspirator a processed flow including purified water from an upper portion of the supercritical core region.

11. The method according to claim 10, further comprising discharging via the vent a waste stream including unpurified water from the enclosed volume.

12. The method according to claim 11, further comprising recycling the waste stream back into the enclosed volume via the burner assembly.

13. The method according to claim 11, wherein:

the supercritical core region and the transcritical intermediate region assume the upward helical flow; and the upward helical flow and the diverter urge precipitated ionic compounds in the supercritical core region to move laterally out from the supercritical core region, through the transcritical intermediate region, and into the subcritical outer region where the precipitated ionic compounds dissolve.

14. The method according to claim 13, wherein:

a first portion of the subcritical wash stream is injected into the enclosed volume via a first injector of the injector assembly;

a second portion of the subcritical wash stream is injected into the enclosed volume via a second injector of the injector assembly;

the first injector and the second injector are arranged on opposite lateral sides of the burner assembly from each other.

15. The method according to claim 14, wherein:

the first portion and the second portion of the subcritical wash stream are each injected in a direction skew with respect to the longitudinal axis of the reactor shell; and the first portion and the second portion of the subcritical wash stream are injected in a direction skew with respect to each other.

16. The method according to claim 10, wherein:

the burner delivers the fuel into the enclosed volume in a direction coaxial with the longitudinal axis of the reactor shell;

the fuel includes a waste water stream delivered by a core feed of the burner assembly;

the fuel includes an oxidizer delivered by an oxidizer feed of the burner, the oxidizer feed being arranged annularly around the core feed; and the waste water stream and the oxidizer feed are not premixed before being introduced into the enclosed volume.

17. The method according to claim 10, wherein:

the waste water stream includes water and organic material;

the organic material is oxidized to carbonaceous material in the supercritical core region;

the purified water includes water and $CO_2$.

18. The method according to claim 11, wherein an interior of the aspirator is at a lower pressure than the enclosed volume, thereby urging the purified water into the interior of the aspirator.

19. The method according to claim 11, wherein the method is performed in a continuous or semi-continuous manner.

20. The method according to claim 11, wherein the supercritical core region, transcritical intermediate region, and the subcritical outer region are each coaxial with the longitudinal axis of the reactor shell.

* * * * *